March 21, 1967 S. E. CARLTON 3,310,283
PRESSURE SEAL GROOVE
Filed Aug. 23, 1965
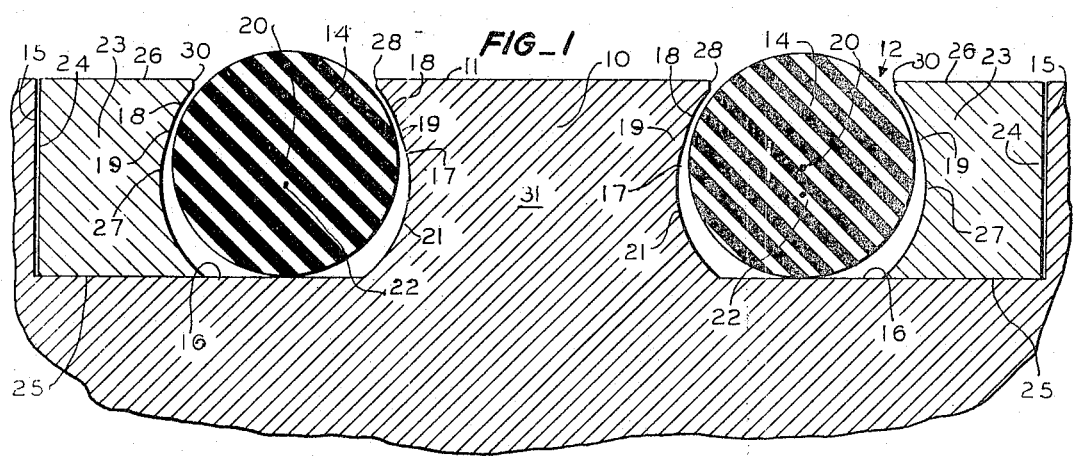
FIG_1
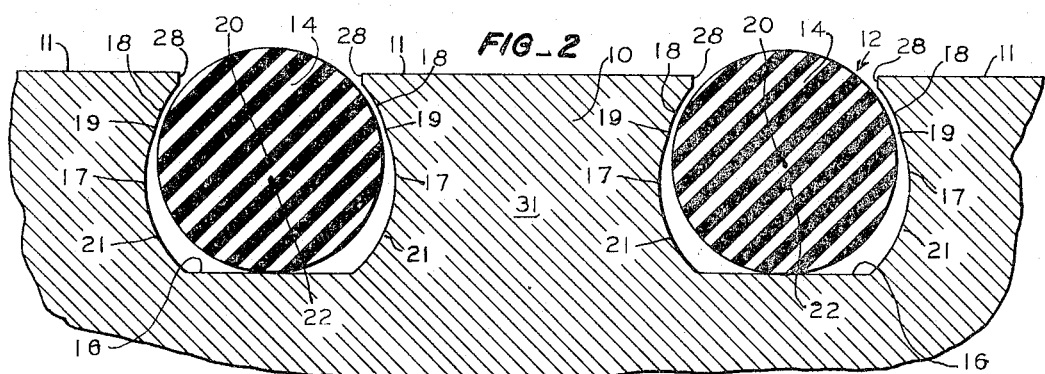
FIG_2
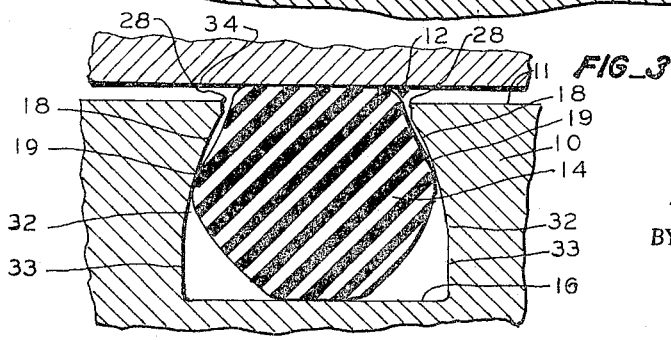
FIG_3
INVENTOR.
SYDNEY E. CARLTON
BY United States Patent Office 3,310,283
Patented Mar. 21, 1967

3,310,283
PRESSURE SEAL GROOVE
Sydney E. Carlton, 240 W. Hereford,
Gladstone, Oreg. 97027
Filed Aug. 23, 1965, Ser. No. 481,572
8 Claims. (Cl. 251—357)

This invention is a continuation-in-part of United States patent application Serial No. 289,051, filed June 19, 1963, by Sydney E. Carlton and entitled, "Lift Valve."

This invention relates to grooves for mounting and retaining resilient pressure seals such as O rings and the like in the mating surfaces of pipeline flanges, knife type gate valves and wherever movable surfaces are required to be sealed. The invention relates particularly to a groove having a shaped interior surface which enables the seal to effectively retain a pressure seal engagement when the grooved surface and seal are operationally positioned against another surface. The shaped sides in the groove enable the seal to produce a water-tight seal with an established configuration thereby immobilizing the seal and holding it in place against the severe and erosive forces of pressure and entrained abrasives.

Ring-type reslient pressure seals such as O rings, are in wide usage in industry, especially in the oil and gas production and refining. They are extensively used in valves and flow lines which carry crude oil. Often sand and other foreign detrital material is carried in suspension in the gas and oil flowing through the line. Such material takes its toll in the failure of seals. In addition, the lines and valve equipment frequently are subjected to high velocity fluids pumped at relatively high pressures which add disruptive features to the various seals in the line.

Mounting grooves for ring type resilient pressure seals are conventionally rectangular in cross-section with semi-circular or flat bottoms. Conventional grooves for mounting ring-type seals are incapable of imparting a gripping shape to the pressure seal. Accordingly, as the faces are moved or passed into sealing engagement, the seal will tend to flow and rotate within the groove in a plastic-like manner especially when subjected to high pressure. As the seal rotates the sealing effect is broken and the sand laden crude oil, gas or other product, engages the rotating seal and is trapped in the groove, cutting and eroding both it and the mounting groove. The wide usage of such seals multiplies the down time for refinery components, pumping units, tank farms and the like, while the eroded seal and flange parts are cleaned and replaced. Furthermore, ring type resilient seals in conventional grooves tend to retain and pack sand, scale and other detrital material within the groove, causing a bulging of the seal out of position and destroying its sealing effect.

The conventional groove is even more ill-suited when used in mounting resilient ring type seals in gate valves. Not only do all of the above-mentioned problems limit the sealing effectiveness of the sealing ring, but the seal is subjected to shear forces as it comes into wiping contact with the interior surface of the valve cavity.

It is accordingly an object of the present invention to provide a groove having a shaped interior surface which retains a ringe type pressure seal immobile and which prevents the plastic flow when it is operational and subject to all ranges of fluid pressures.

It is another object of the present invention to provide a groove for retaining resilient ring type pressure seals in such a manner that the seal cannot roll in place even in wiping engagement, thereby preserving its sealing qualities and making it and the groove resistsant to erosion and cutting even under the most adverse conditions of pressure, fluid velocity and high abrasive suspensions.

It is yet another object of the present invention to provide a groove for retaining resilient ring type pressure seals in such a manner that when operational, the interior shape of the groove acts on the retained seal imparting a locking shape in the seal so that it cannot roll or flow even when it is in a plastic state under variable pressure conditions.

It is a further object of the present invention to provide a groove having a shaped interior surface which makes the groove suitable as a mounting retainer for resilient ring type pressure seals and flanged surfaces and other types of pipeline unions and especially suitable in the wiping sealing surfaces of lift valves.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Referring to the drawings:

FIGURE 1 is a vertical section through the grooves and retained resilient ring type pressure seals where keeper rings are used to provide one face of the seal groove;

FIGURE 2 is a vertical section showing shaped seat grooves without keeper rings; and FIGURE 3 is another form of groove having vertical sides adjacent the bottom thereof, with the seal shown in pressure engagement with an opposed surface.

Referring now more particularly to the drawings, in which like reference numerals indicate like parts in the several views, and with particular reference to FIGURE 1, 10 is a fragment of the movable blade or knife of a gate valve. However, this is merely an example as 10 may also be a stationary member such as a flanged pipe union and the like. On its sealing face 11 a groove 12 is cut. The groove 12 is wider than the diameter of the O ring seal 14 which is to be retained therein and has a depth slightly less than the diameter as is conventional. The groove has one vertical wall 15 and a flat bottom 16. The other wall 17 is shaped in a special manner. For a short distance downwardly from the surface 11 it is cut at 18 on the same arc as the seal 14 and on the same center 20 but with a slightly larger radius. For the remainder of the distance to the bottom 16, it is cut on a larger arc 21 with a different and vertically lower radius with its center at 22. After the ring 14 is positioned within the groove 12 adjacent the shaped wall 17, a keeper ring 23 is inserted within the remaining space to retain the O ring 14. The peripheral face 24 of the keeper ring 23 is vertical to abut face 15 of the groove, its bottom face 25 is flat to rest on face 16 and its top face 26 is flush with the top face 11. The inner surface 27 is cut with equal and opposite curves to those of face 18. The entrance edge 28 of the face 18 and entrance edge 30 of surface 27 are rounded or even vertical to eliminate the knife-like edge at the top surface. It will be observed that at the intersection of the curve 18 and the curve 21 forming the sides of the groove, there is a transverse annular ridge 19. As will be described later, this annular ridge 19 performs an important dividing function in the operation of the seal.

Frequently sealing O rings are used in pairs. As illustrated in FIGURE 1 there are two oppositely formed concentric or spaced grooves separated from the other by an annular land area 31. These grooves have outer vertical sides 15 and flat bottoms 16. The island area 31 has the walls on each side shaped with the curves 18 and 21 and with the entrance edge 28 either rounded or vertical as before described. Keeper rings 23 are formed oppositely to provide means for retaining and removing the O rings or seals 14. It is not necesary to have the grooves oppositely formed and one or the other forms may be duplicated for multiple needs. The advantage of oppositely formed grooves is the difference and substantially opposite response in use.

Pressure seal 14 is made of resilient and resistant material, such as Teflon, plastic, glass and other suitable material and may be a continuous circle or ellipse, or an oval with parallel sides, to meet the plan of the groove provided for the particular use. The O ring pressure seal 14 is usually of circular cross-section.

FIGURE 2 shows the form of groove 12 having no removable keeper ring 23. The operative face 11 may be cut with one, two or more seal receiving grooves 12 each having a flat bottom 16 with opposed shaped walls 17. As before stated the walls are cut with the same curve 18 or arc as the seal 14 on the same center 20 for a short distance from the top. The remainder of the face is cut with a larger arc 21, on a different radius with a lower center 22. As before also, the intersection of arcs 18 and 21, there is an annular ridge 19. Since the intersection of arc 18 and the surface 11 leaves a knife-like edge at the entrance to the groove, the same is either rounded or made vertical as at 28 to eliminate any possible damage to the seal 14. The depth of the grooves 12 is slightly less than the diameter of the seal 14 to be certain it is the seal which contacts the opposite operating surface. As will be observed, the width of the groove 12, the entrance opening is slightly less than the diameter of the O ring seal 14, while the remainder accommodates the seal with room to spare around it.

FIGURE 3 not only shows a variant form of groove but also demonstrates with some exaggeration, the operative effect of pressure or wiping contact on the seal 14. The groove 32 has its vertical walls formed much as before with the portion adjacent the entrance curved on the same arc 18 but slightly greater radius as the seal 14. It is then curved to below its midpoint with a larger arc 21 on a lower center 22 on a still larger radius. The intersection of arcs 18 and 21 leave the same annular ridge 19. The walls become vertical as at 33 from approximately the midpoint to the flat bottom 16. The entrance edges are either rounded or made vertical at the entrance 28. In FIGURE 3 the operating opposite face 34 is exerting sealing pressure on the seal 14 to bring about sealing engagement. In so doing the seal 14 is distorted in the manner shown. The form is substantially the same whether the engagement is presure or compression of a moving surface 34.

As FIGURE 3 shows the pressure or compression contact of the opposed surface 34 on the seal 14 provides an external force upon the seal 14 which is retained within the groove regardless of whether a keeper ring 23 is used or whether the groove is made undercut as shown in FIGURE 2 or whether the groove is widened at the bottom as shown in FIGURE 3, or any combination of them. The result of this external force distorts the seal 14 so that both the top and bottom thereof are compressed. In compressing the exposed top portion of the seal 14, the actual engaging and sealing surface, it is flattened so that a considerable area of the seal 14 is in sealing engagement with the face 34. From actual observation under pressure and compression, it has been discovered that because of the opposed peaks 19 which are the points where the radius changes in the walls of the O-ring grooves, the O-ring seal 14 is distorted to a concave shape, while below the annular ridge 19 the shape of the seal bulges so that it is in engagement with the walls on the larger and different radius for a short distance. The shape of the groove and the resulting pressure on the O-ring seal 14 produces a distorted shape which keys the seal within the groove during operative engagement so that the seal 14 will not slip or roll and be subject to the usual plastic flow which results in cutting and wearing of the O-ring as well as a poor and uncertain peak. In the present device the shape of the undercut grooves permits a water-tight sealing engagement of the O-ring without any roll or plastic flow and assures that a substantial engagement of the O-ring is maintained against the opposed surface at all times. It will also be observed that the expanding of the O-ring to contact the walls of the groove below the annular ridge 19 prevents the accumulation of scale and abrasives in the groove minimizing the effect of abrasion and wear of the sealing ring during operation. This also reduces the down time for cleaning of the grooves and maintains a proper seat for the sealing rings at all times.

It will thus be observed that all of the objects of this invention have been attained and that many others will be apparent to those skilled in this art.

I claim:

1. In a groove retaining an O-ring seal of stated diameter for sliding sealing position with an opposed surface, the combination of a surface to be sealed, a groove in said surface having a depth of less than the diameter of the O-ring, undercut symmetrical side walls having the upper portion cut on the same curvature and center as the O-ring and the remainder cut on a larger arc with a lower center than the O-ring center leaving a transverse peak at the intersection of said curves, and a groove opening of a width less than the diameter of the O-ring.

2. In a groove retaining an O-ring of stated diameter for sliding sealing position with an opposed surface, the combination of a surface to be sealed, a groove in said surface having a depth less than the diameter of the O-ring and a flat bottom, undercut symmetrical side walls having the upper portion cut on the same curvature and center as the O-ring and the remainder cut on a larger arc with a lower center than the O-ring center leaving a transverse peak at the intersection of said curves, and a groove opening of a width less than the diameter of the O-ring.

3. In a groove retaining an O-ring seal of stated diameter for sliding sealing position with an opposed surface, the combination of a surface to be sealed, a groove in said surface to receive an O-ring seal, said groove having a depth less than the diameter of the seal to expose a portion of the same above the said surface, undercut symmetrical side walls having the upper half cut on two different arcs, the upper arc being that of the curve of the seal on the same center and the lower portion thereof being the arc of a larger radius on a center lower than that of the O-ring seal, an inwardly projecting peak at the intersection of said arcs and the lower one-half of said side walls being substantially vertical, and a groove opening of a width less than the diameter of the O-ring seal.

4. A continuous groove for retaining continuous resilient pressure seals of circular cross section, said groove having a flat bottom and symmetrically shaped inwardly facing sides each with upper and lower concave curves in the upper one-half of said walls and each with a continuous transverse ridge at the intersection of said curves, the distance between the ridges being greater than the depth of said groove said distance being greater than the width of the entry to the groove and less than twice the radii of the curvature of said curves.

5. A groove for receiving and retaining O-ring seals of stated diameter, a member having a surface to be in sliding sealing engagement with an opposed member, a groove in said surface receiving and retaining an O-ring seal, said groove having a flat bottom and a depth less than the cross-section of the O-ring, and one wall undercut with two vertical curves, the first curve being an arc on the same center as the O-ring but on a slightly larger radius and the second curve being on a still larger radius on a vertically lower center than that of the O-ring, the intersection of the two curves forming a lateral continuous ridge, the distance between the ridges being greater than the width of the entry to the groove, a keeper ring fitting flush within said groove and surface having one face undercut to symmetrically oppose said first undercut face and forming therewith an O-ring retaining groove, said groove having a maximum width at its mid-section slightly larger than the diameter of the O-ring seal and an entry opening in said surface smaller than said diameter permitting a portion of the O-ring seal to project above said surface and blunted edges on said opening.

6. A groove for receiving and retaining O-ring seals of stated diameter, a member having a surface to be in sliding sealing engagement with an opposed member, a groove in said surface receiving and retaining an O-ring seal, said groove having a flat bottom and a depth less than the cross-section of the O-ring, and one wall undercut with two vertical curves in its upper portion and a vertical wall in the lower portion, the first curve being an arc on the same center as the O-ring but on a slightly larger radius and the second curve being on a still larger radius on a vertically aligned lower center than that of the O-ring, the intersection of the two curves forming a lateral continuous ridge, the distance between said ridges being greater than the width of the entry to the groove, a keeper ring fitting flush within said groove and surface having one face undercut to symmetrically oppose said first undercut face and forming therewith an O-ring retaining groove, said groove having a maximum width at its mid-section slightly larger than the diameter of the O-ring, and an entry opening in said surface smaller than said diameter to permit a portion of the O-ring seal to project therethrough and blunted edges on said opening.

7. A fluid tight pressure seal for sliding opposed surfaces with continuous O-rings in combination a sealing surface, an O-ring seal member of stated diameter, a groove in said surface receiving and retaining said O-ring seal, said groove having multiple curved vertically opposed symmetrical walls, the first curve extending downwardly from the surface a short distance and curved with the arc of the said O-ring seal on a slightly larger radius, and the second curve being on a still larger radius with center downwardly offset with respect to the center of the O-ring seal, said groove also having a depth less than the diameter of said O-ring and a width greater at its mid-section than said diameter, and an opening in said surface less than the diameter of said O-ring seal to permit said seal to extend outwardly of said surface.

8. A fluid tight pressure seal for sliding opposed surfaces with continuous O-rings in combination a sealing surface, an O-ring seal member of stated diameter, a groove in said surface receiving and retaining said O-ring seal, said groove having multiple curved vertically opposed symmetrical walls, the first curve extending downwardly from the surface a short distance and curved with the arc of the said O-ring seal on a slightly larger radius, and the second curve being on a still larger radius with center downwardly offset with respect to the center of the O-ring seal, said curves being in the upper one-half of the groove depth with a vertical side for the lower portion, said groove also having a depth less than the diameter of said O-ring seal and a width greater at its mid-section than said diameter, and an opening in said surface less than the diameter of said O-ring to permit a portion of said seal to extend outwardly therethrough.

References Cited by the Examiner

UNITED STATES PATENTS

| | | |
|---|---|---|
| 2,417,494 | 3/1947 | Hoof. |
| 2,678,187 | 5/1954 | Peters _____ 251—357 |
| 2,870,987 | 1/1959 | Greenwood _____ 251—327 |
| 3,184,247 | 5/1965 | Leutwyler _____ 277—177 XR |

M. CARY NELSON, *Primary Examiner.*

HENRY T. KLINKSIEK, *Examiner.*